US007427054B2

(12) United States Patent
Sommerville et al.

(10) Patent No.: US 7,427,054 B2
(45) Date of Patent: Sep. 23, 2008

(54) ANTI-RAM RAID PLINTH

(75) Inventors: David Sommerville, Edinburgh (GB); David W. Wallace, Fife (GB); Paul Theasby, Fife (GB)

(73) Assignee: NCR Corporation, Dayton, OH (US)

(*) Notice: Subject to any disclaimer, the term of this patent is extended or adjusted under 35 U.S.C. 154(b) by 60 days.

(21) Appl. No.: 11/089,206

(22) Filed: Mar. 24, 2005

(65) Prior Publication Data

US 2005/0224688 A1 Oct. 13, 2005

(30) Foreign Application Priority Data

Mar. 25, 2004 (GB) ................................ 0406746.8

(51) Int. Cl.
*F16M 13/00* (2006.01)

(52) U.S. Cl. ...................................... 248/551; 248/678

(58) Field of Classification Search ............ 248/346.01, 248/637, 678, 679, 188.1, 618, 551, 638, 248/650, 548, 900; 109/24.1; 52/98, 292, 52/36.1

See application file for complete search history.

(56) References Cited

U.S. PATENT DOCUMENTS

2005/0121593 A1* 6/2005 Acketts ...................... 248/650
2006/0056921 A1* 3/2006 Simmons .................... 405/203

FOREIGN PATENT DOCUMENTS

| | | | |
|---|---|---|---|
| EP | 1 184 819 | A3 | 10/2003 |
| FR | 2 820 165 | A1 | 8/2002 |
| GB | 2 273 528 | A | 6/1994 |
| GB | 2297803 | A * | 8/1996 |

OTHER PUBLICATIONS

ATM Security Working Group: ""Stand-Alone" ATM's: Recommended Security Guidelines" Internet Article, 'Online! Sep. 2002, XP002329896 Retrieved from the Internet: URL:http://www.atmianortham.com/pdf/stand_alone.pdf> 'retrieved on May 30, 2005!.

Scotia Security Group: "Banking Solutions DS20 ATM Stand" Internet Article, 'Online ! OCt. 11, 2004, XP002329897 URL:http://www.scotia.co.uk/pdfs/DS20%20A4.pdf> 'retrieved on May 30, 2005! .

* cited by examiner

*Primary Examiner*—Gwendolyn Baxter
(74) *Attorney, Agent, or Firm*—Gregory A. Welte

(57) ABSTRACT

A plinth is disclosed for the support of an attached object. The plinth has a fixing portion for embedding into a secure foundation. The plinth also has a base plate for support of the object, through support means, which are arranged to crumple under an impact, without the object becoming detached from the plinth.

12 Claims, 6 Drawing Sheets

ANTI-RAM RAID PLINTH

BACKGROUND OF THE INVENTION

The present invention relates to a plinth for the support of a valuable object such as an Automated Teller Machine (ATM).

ATMs that are not in through the wall locations, in banks and the like, are normally bolted directly to the ground through the safe.

One of the main attacks on ATMs results from criminals using a truck or the like to ram the ATM. The force of the blow causes the ATM to shear from bolts. Lifting equipment is then used to load the ATM onto a flat bed truck, for removal from the premises. An alternative form of attack is to simply tie ropes around the ATM and pull it over, again shearing it from its bolts.

Increasingly, ATMs employ ink-staining technology to deter criminals from stealing ATMs, as stained notes can be replaced at no cost to the ATM service providers. However, even if it is known that notes will have been stained, if the notes are not recovered then the ATM service provider will not have their cash replaced.

SUMMARY OF THE INVENTION

Hence, it is an object of the present invention to prolong the time taken to remove an ATM from the scene of an attempted theft.

According to a first aspect of the present invention there is provided a plinth, for the support of an attached object, the plinth having a fixing portion for embedding into a secure foundation, a base plate for support of the object, through support means which are arranged to crumple under an impact, without the object becoming detached from the plinth.

Preferably, the plinth comprises flexible linkages that are arranged for connection between the base plate and the object to be supported.

Preferably, the flexible linkages are distinct from the support means. Most preferably the flexible linkages take the form of bendable rods, universal joints, chains or flexible wires, that are connectable to both the base plate and the object to be supported.

Preferably, the support means are metal sheets arranged to support the object, when in use. Most preferably, the support means are constructed from sheet steel.

Most preferably, the support means are arranged to crumple under the impact of a substantial force. The force very much depends on the weight of the terminal. Under normal use the terminal is secure but with a sudden impact, such as a car hitting the terminal the plinth will deform, as described above.

Preferably, the plinth comprises a foam release mechanism, arranged to inject foam into the interior space defined by the base plate and the support means, when the plinth has been caused to crumple.

Alternatively, the interior space defined by the base plate and the support means is filled with foam prior to use.

According to a second aspect of the present invention there is provided a method of delaying the removal of an object supported by a plinth as claimed in any preceding claim, the method including the steps of arranging that the plinth crumples under the influence of a force, without the object becoming detached from the plinth; and injecting foam into the interior of the base plate when the plinth has been caused to crumple, so as to jam any cutting tools used to attempt to cut the flexible linkages between the base plate and said object.

BRIEF DESCRIPTION OF THE DRAWINGS

An embodiment of the present invention will now be described, by way of example, with reference to the accompanying drawings, in which.

DETAILED DESCRIPTION

Figure 1:
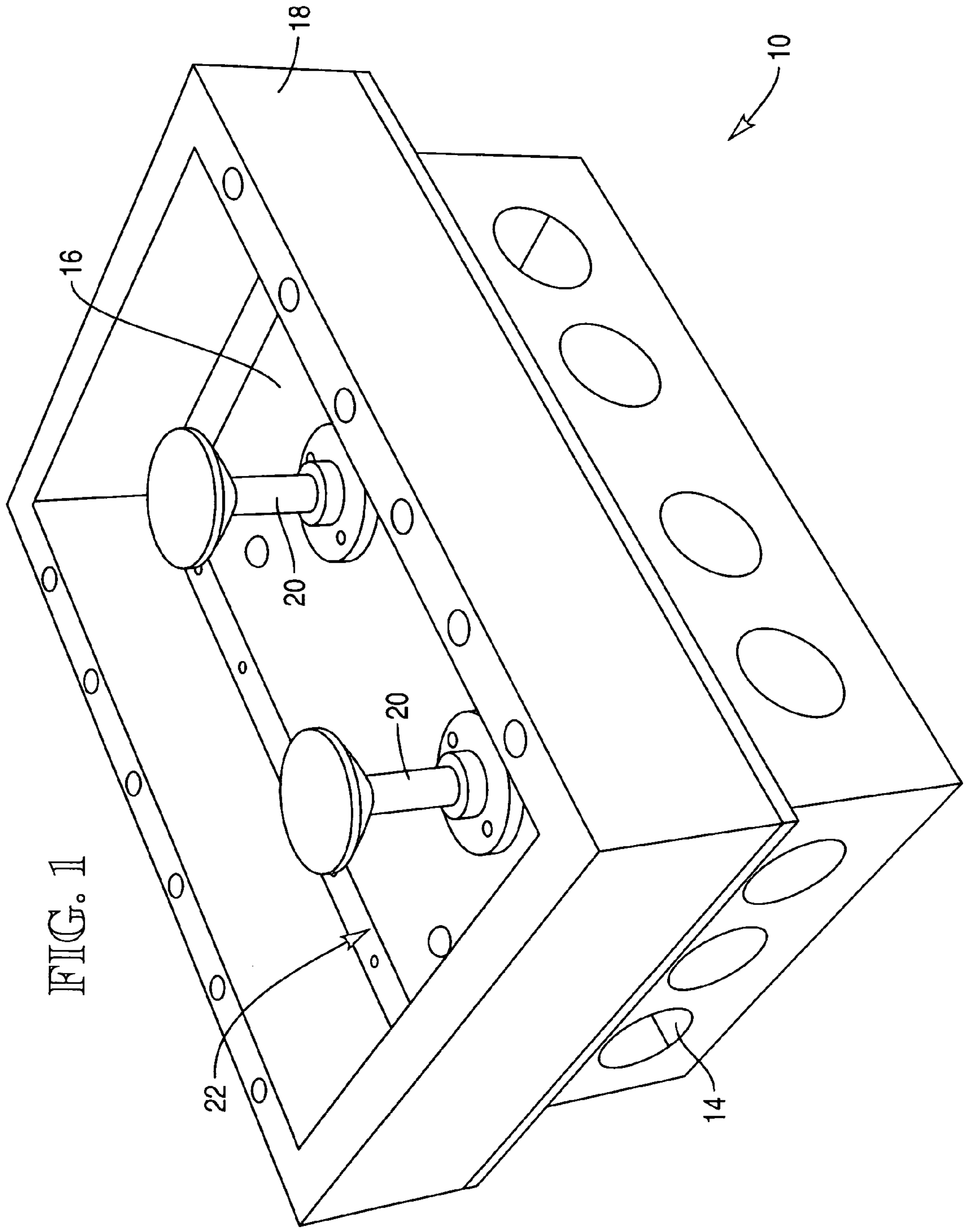
FIG. 1 is a schematic diagram of a plinth in accordance with the invention.
Figure 2:
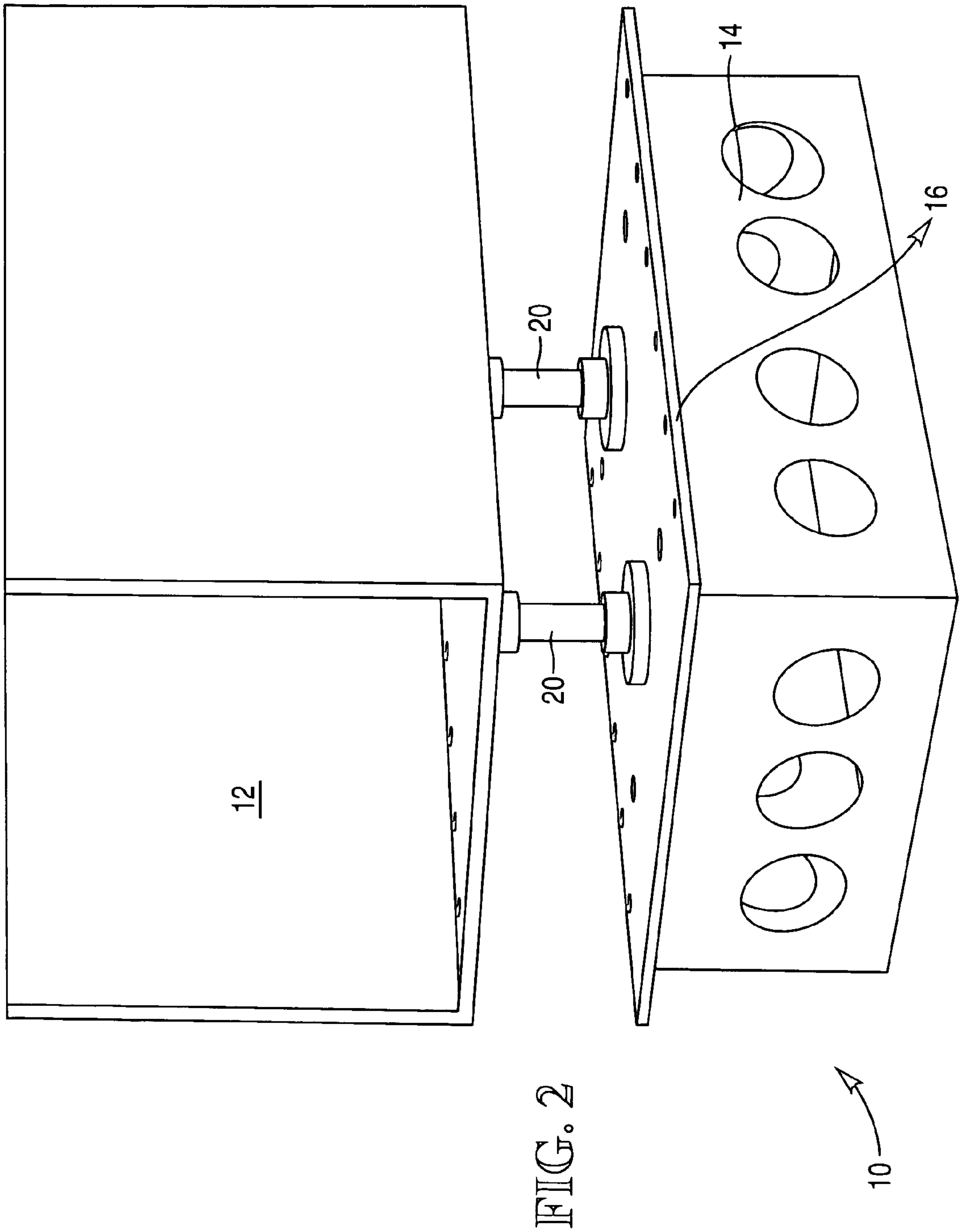
FIG. 2; is a schematic diagram of the plinth of FIG. 1, supporting an ATM, with the sheet steel support means of the plinth removed so as to more clearly illustrate the flexible linkages.
Figure 3:
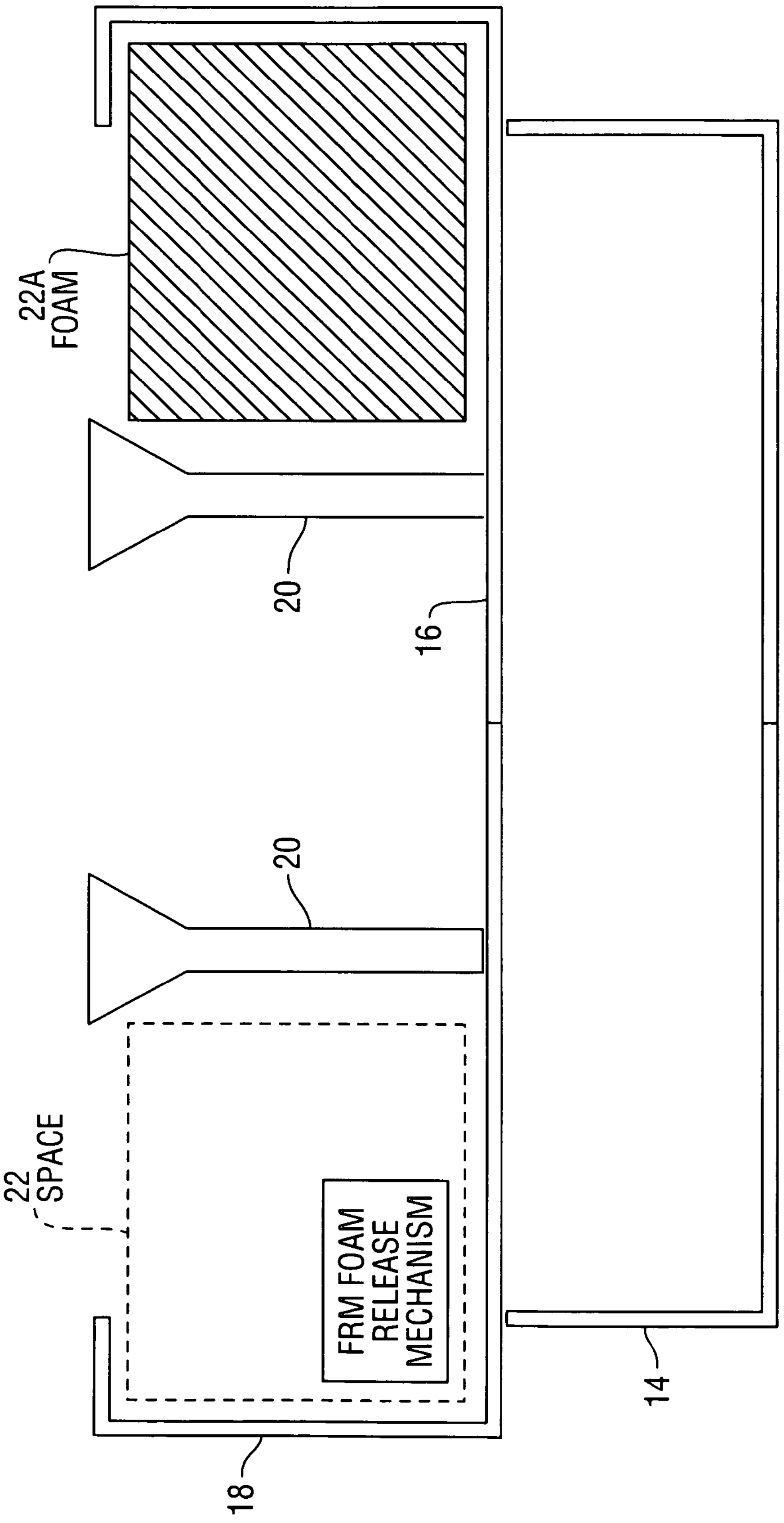
FIG. 3 is a schematic cross-sectional view of FIG. 1, taken in the direction of the arrow adjacent the call-out "10." It shows solid foam 22A, which is installed during manufacture.
Figure 4:
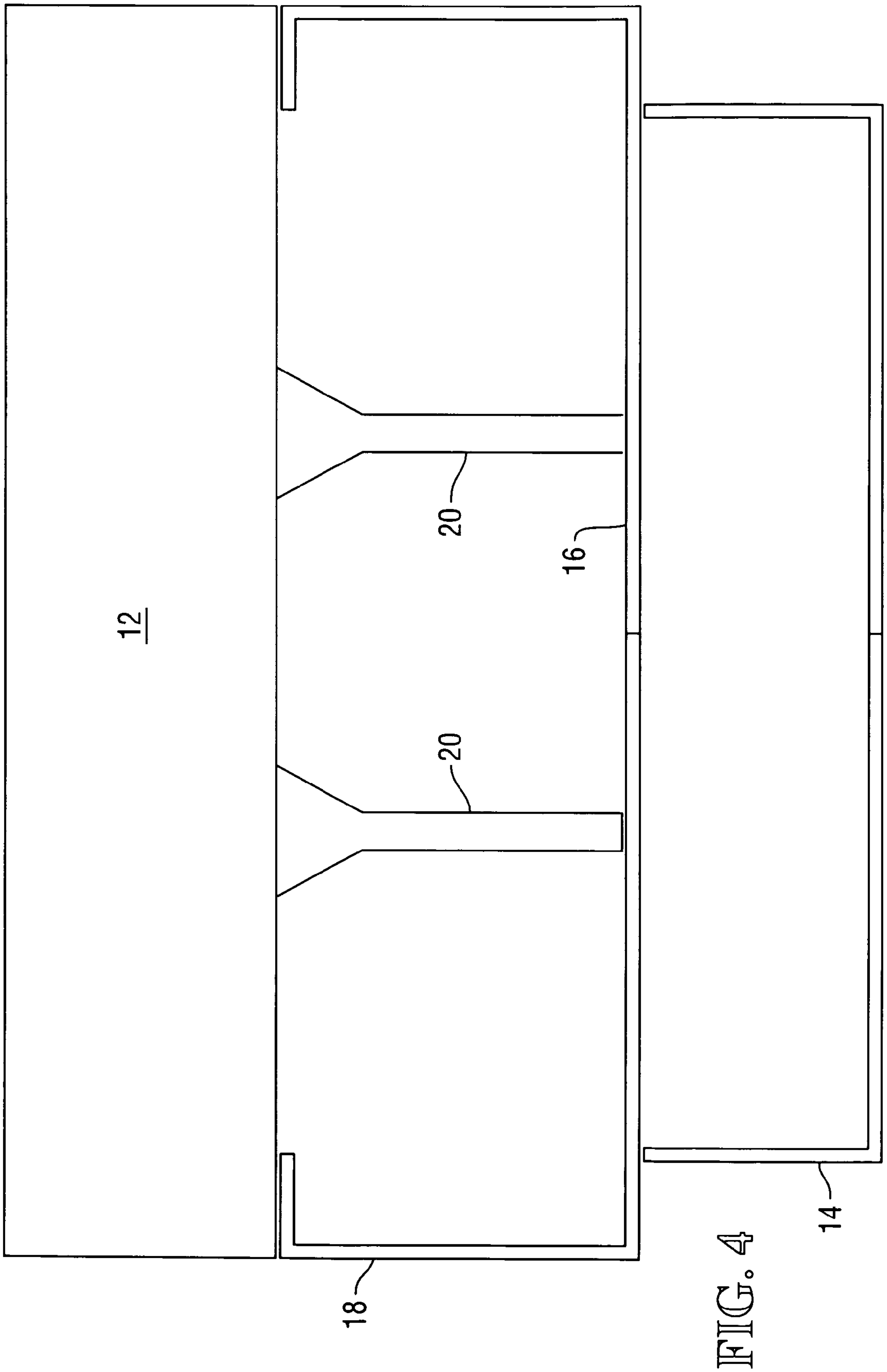
FIG. 4 illustrates an ATM 12 installed on the support means 18.
Figure 5:
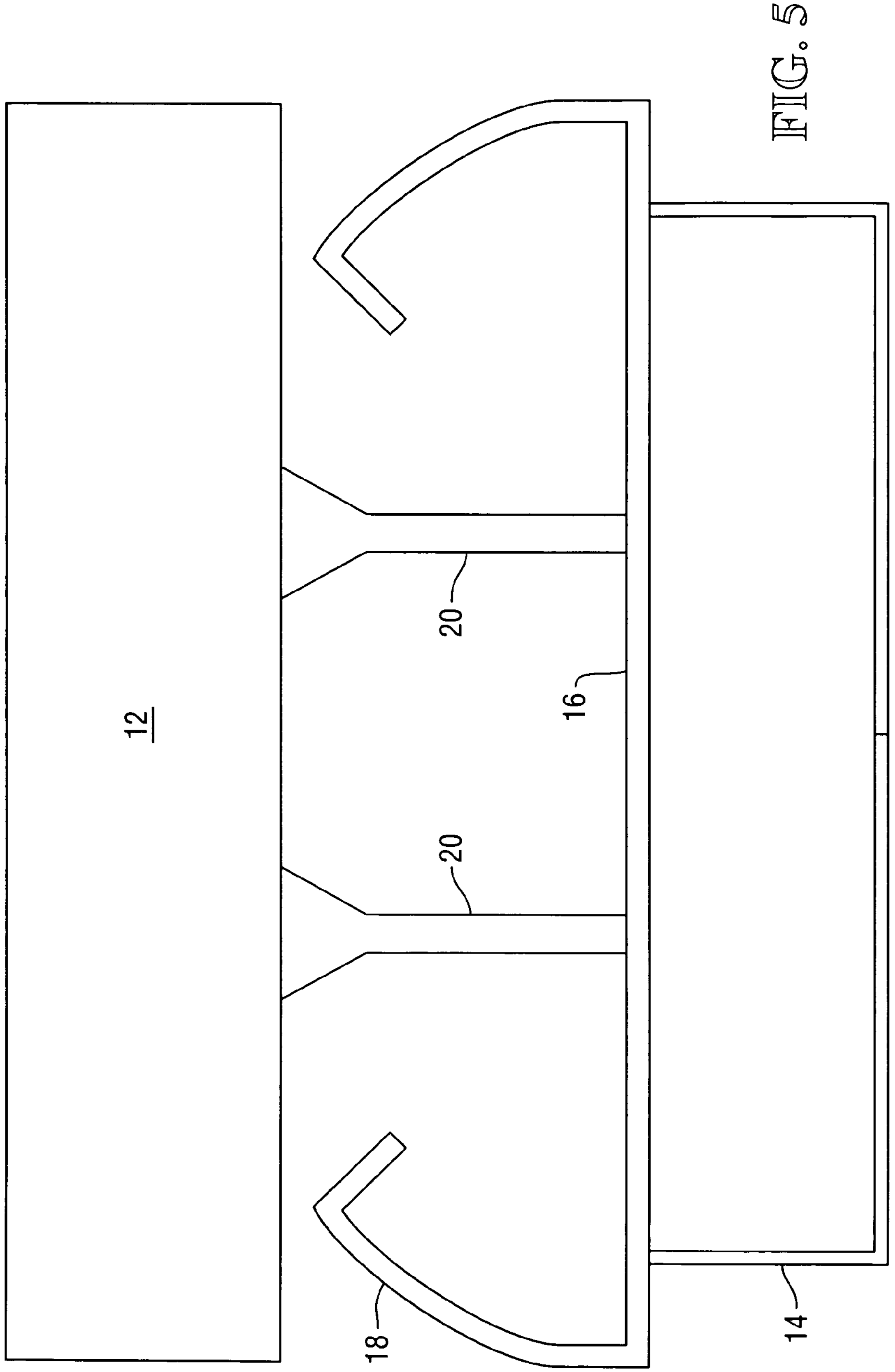
FIG. 5 illustrates crumpling of the support means 18, yet the ATM 12 is still held fast by the flexible linkages.
Figure 6:
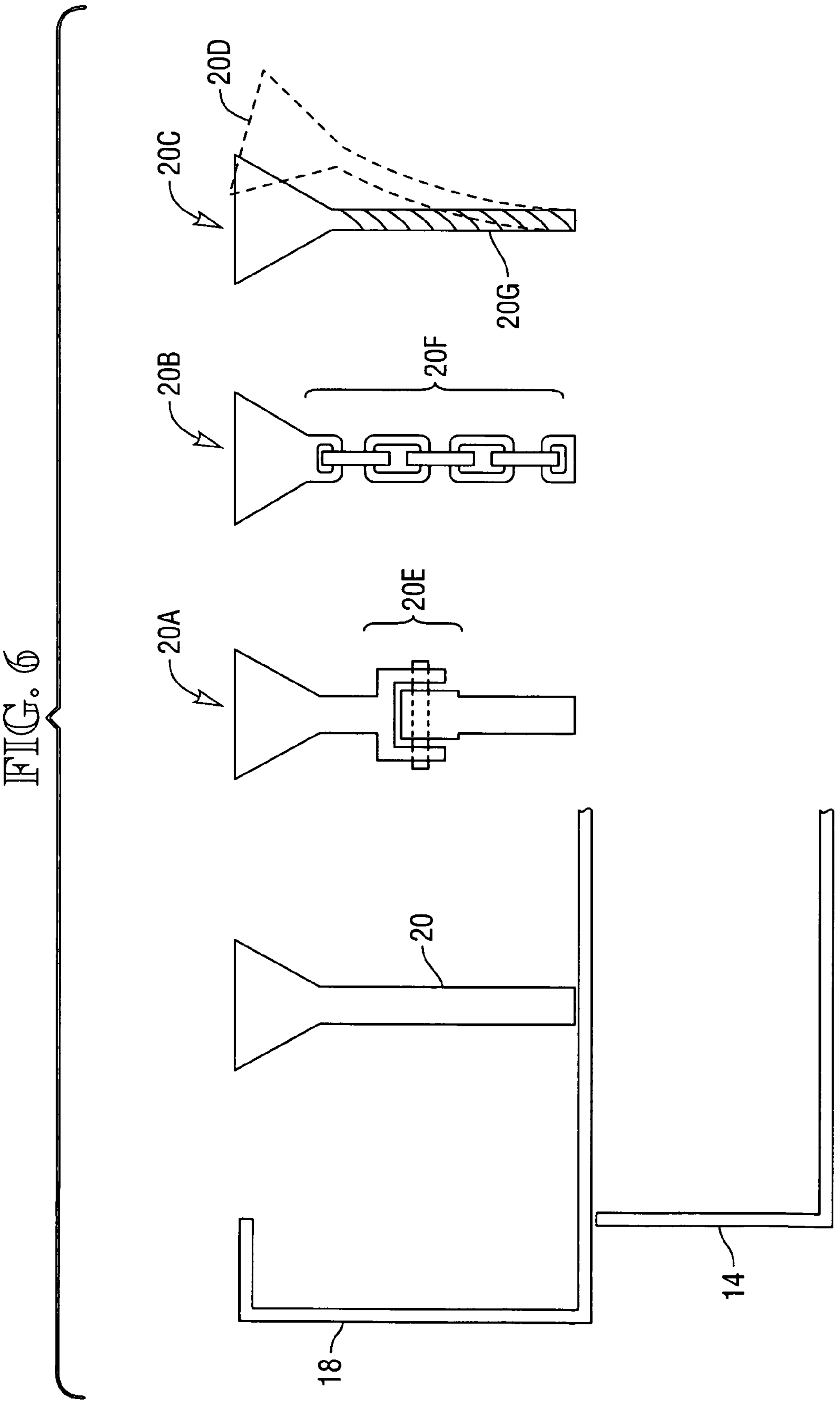
FIG. 6 illustrates three different styles of flexible linkage 20. One linkage 20A comprises a universal joint 20E. A second linkage 20B comprises a chain 20F. A third linkage comprises a flexible wire or cable 20G, or bendable rod 20G, which flexes into phantom position 20D.

FIG. 1 illustrates a plinth 10, for the support of an attached object such as an ATM 12 (FIG. 2). The plinth 10 has a fixing portion 14 for embedding into a secure foundation, such as a concrete base (not shown). A base plate 16 is arranged for support of the ATM 12, through support means 18. The support means 18 are arranged to crumple under an impact, of an excessive force, without the ATM 12 becoming detached from the plinth 10.

The plinth 10 comprises flexible linkages 20, which are more clearly disclosed in FIG. 2. The linkages are arranged for connection between the base plate 16 and the ATM 12. In this embodiment the linkages are formed from bendable rods, which are distinct from the support means 18.

In other embodiments the linkages can be formed from other materials, such as universal joints or flexible wires, chains that are connectable to both the base plate 16 and the ATM 12 or other object to be supported. Also, the support means 18 are metal sheets, such as sheet steel, arranged to support the object, when in use.

The plinth 10 further comprises a foam release mechanism FRM, which is arranged to inject foam into the interior space 22 defined by the base plate 16 and the sheet steel support means 18, when the plinth has been caused to crumple. In an alternative embodiment the interior space 22 can be filled with foam prior to use. This inhibits cutting tools, if they are used by criminals to try to cut the flexible linkages 20.

The plinth is installed by embedding the portion 14 in concrete or other suitable material. Thereafter, the plinth 10 delays the removal of an ATM 12 or other object supported by a plinth because the plinth will crumple under the influence of a force, greater than a predetermined force, without the ATM or other object becoming detached from the plinth. In other words the ATM 12 will fall onto the floor whilst still attached to the plinth 10.

This means that criminals will have to take further action in order to detach the ATM, which is not necessary with conventional plinths as the connection between a conventional plinth and an ATM is sheared during by the force of the ram raider driving a vehicle into the plinth and ATM. In addition, the presence of foam in the interior space 22 causes cutting tools to jam, if they are used in an attempt to severe the link between the plinth 10 and the ATM 12, further increasing the time taken.

Modifications can be incorporated without departing from the scope of the present invention.

What is claimed is:

1. A plinth for supporting an Automated Teller Machine, ATM, comprising:

a) a fixing portion (14) for embedding into, or attaching to, a secure foundation;

b) support means (18) comprising a sheet metal box connected to the ATM;

c) a base plate (16) located between the support means (18) and the fixing portion (14), and connecting the support means (18) with the fixing portion (18);

d) two or more flexible linkages which i) establish a connection between the ATM and the base plate (16), which connection is independent of any connection provided by the support means (18).

2. A plinth as claimed in claim 1, wherein the flexible linkages take the form of bendable rods, universal joints, chains or flexible wires, that are connected to both the base plate and the ATM.

3. A plinth for supporting an Automated Teller Machine, ATM, the plinth comprising:

a) a fixing portion (14) for embedding into a secure foundation;

b) support means (18) comprising a sheet metal box connected to the ATM;

c) abase plate (16) located between the support means (18) and the fixing portion (14), and connecting the support means (18) with the fixing portion (18); and d) a foam release mechanism for injecting foam into an interior space defined by the base plate (16) and the support means (18), when the support means (18) has been caused to crumple.

4. A plinth for supporting an Automated Teller Machine, ATM, the plinth comprising:

a) a fixing portion (14) for embedding into a secure foundation;

b) support means (18) comprising a sheet metal box connected to the ATM;

c) a base plate (16) located between the support means (18) and the fixing portion (14), and connecting the support means (18) with the fixing portion (18), wherein the interior space is filled with foam prior to use.

5. A plinth for supporting an Automated Teller Machine, ATM, comprising:

a) a fixing portion (14) for embedment into a concrete foundation, which fixing portion (14) comprises a hollow box having holes in its walls;

b) abase plate (16) affixed to the fixing portion (14);

c) support means (18) which comprises sheet metal walls extending between the base plate (16) and the ATM; and d) flexible linkages (20) extending between the base plate (16) and the ATM, which inhibit removal of the ATM when the support means (18) are damaged, wherein the flexible linkages provide a connection between the ATM and the base plate (16) distinct from any such connection provided by the support means (18).

6. A plinth as claimed in claim 5, wherein the flexible linkages take the form of universal joints, chains or flexible wires, that are connected to both the base plate member and the ATM.

7. A plinth for supporting an Automated Teller Machine, ATM, comprising:

a) a fixing portion (14) for embedment into a concrete foundation, which fixing portion (14) comprises a hollow box having holes in its walls;

b) abase plate (16) affixed to the fixing portion (14);

c) support means (18) which comprises sheet metal walls extending between the base plate (16) and the ATM;

d) flexible linkages (20) extending between the base plate (16) and the ATM, which inhibit removal of the ATM when the support means (18) are damaged; and e) a foam release mechanism for injecting foam into an interior space defined by the base plate member and the support member, when the support member crumples in response to an attack on the ATM.

8. A plinth for supporting an Automated Teller Machine, ATM, comprising:

a) a fixing portion (14) for embedment into a concrete foundation, which fixing portion (14) comprises a hollow box having holes in its walls;

b) a base plate (16) affixed to the fixing portion (14);

c) support means (18) which comprises sheet metal walls extending between the base plate (16) and the ATM;

d) flexible linkages (20) extending between the base plate (16) wad the ATM, which inhibit removal of the ATM when the support means (18) are damaged, wherein the interior space is filled with foam prior to use.

9. A plinth for supporting an Automated Teller Machine, ATM, comprising:

a) base means (14) for anchoring the plinth into concrete;

b) plate means (16) attached atop the base means;

c) located between the plate means (16) and the ATM, i) support means (18), which includes metal sheets which extend between the plate means (16) and the ATM, and ii) chains or flexible cables extending between the plate means (16) and the ATM.

10. Plinth according to claim 9, wherein the base means (14) comprises holes through which concrete can extend.

11. Plinth according to claim 9, wherein the chains or flexible cables prevent removal of the ATM from the base, if the support means (18) is separated from the base plate (16) or from the ATM, or both.

12. Plinth according to claim 9, wherein the support means (18) contains a hollow interior, and the chains or flexible cables are present within the hollow interior.

* * * * *

UNITED STATES PATENT AND TRADEMARK OFFICE

CERTIFICATE OF CORRECTION

PATENT NO. : 7,427,054 B2
APPLICATION NO. : 11/089206
DATED : March 24, 2005
INVENTOR(S) : David Sommerville et al.

It is certified that error appears in the above-identified patent and that said Letters Patent is hereby corrected as shown below:

Column 3, line 33, after "c)" delete "abase" and insert --a base--.

Column 3, line 55, after "b)" delete "abase" and insert --a base--.

Column 4, line 17, after "b)" delete "abase" and insert --a base--.

Signed and Sealed this

Twenty-third Day of March, 2010

David J. Kappos

David J. Kappos
*Director of the United States Patent and Trademark Office*